US008937878B2

United States Patent
Pollanen et al.

(10) Patent No.: US 8,937,878 B2
(45) Date of Patent: Jan. 20, 2015

(54) POWER SAVING MECHANISM IN A RADIO ACCESS NETWORK

(75) Inventors: Ossi Kyosti Antero Pollanen, Espoo (FI); Lasse Mikko Juhani Salminen, Kauniainen (FI)

(73) Assignee: Nokia Solutions and Networks Oy, Espoo (FI)

( * ) Notice: Subject to any disclaimer, the term of this patent is extended or adjusted under 35 U.S.C. 154(b) by 299 days.

(21) Appl. No.: 13/383,464

(22) PCT Filed: Jul. 16, 2009

(86) PCT No.: PCT/EP2009/059120
§ 371 (c)(1),
(2), (4) Date: Jan. 11, 2012

(87) PCT Pub. No.: WO2011/006540
PCT Pub. Date: Jan. 20, 2011

(65) Prior Publication Data
US 2012/0113860 A1    May 10, 2012

(51) Int. Cl.
| | |
|---|---|
| *H04L 1/00* | (2006.01) |
| *H04L 12/26* | (2006.01) |
| *H04W 4/00* | (2009.01) |
| *H04J 3/00* | (2006.01) |
| *H04B 7/212* | (2006.01) |
| *H04B 1/00* | (2006.01) |
| *H04B 15/00* | (2006.01) |

(52) U.S. Cl.
USPC ........... 370/252; 370/329; 370/336; 370/345; 370/442; 455/63.1; 455/296

(58) Field of Classification Search
CPC ... H04L 47/10; H04L 43/50; H04W 72/0446; H04W 84/12; H04W 16/14; H04W 28/04; H04B 1/30; H04B 1/1027
USPC ......... 370/252, 328, 329, 336, 345, 347, 442; 455/63.1, 296
See application file for complete search history.

(56) References Cited

U.S. PATENT DOCUMENTS

| | | | | |
|---|---|---|---|---|
| 4,215,244 A | * | 7/1980 | Gutleber | 370/347 |
| 6,320,854 B1 | * | 11/2001 | Farber et al. | 370/328 |

(Continued)

FOREIGN PATENT DOCUMENTS

| | | |
|---|---|---|
| EP | 1 850 612 A1 | 10/2007 |
| EP | 2056628 A1 | 5/2009 |

(Continued)

OTHER PUBLICATIONS

International Search Report and Written Opinion corresponding to International Application No. PCT/EP2009/059120 dated May 31, 2010.

(Continued)

*Primary Examiner* — Ronald Abelson
(74) *Attorney, Agent, or Firm* — Squire Patton Boggs (US) LLP (57) ABSTRACT

The present invention relates to providing methods and apparatus for determining whether a cell in a radio access network could have been powered down during at least one time slot in a predetermined period of time. Measurement data relating to the cell is used to determine whether the neighbouring cells had sufficient spare capacity to handle the network traffic originating from cell during the time slots in the predetermined period of time.

10 Claims, 2 Drawing Sheets

(56) References Cited

U.S. PATENT DOCUMENTS

| | | |
|---|---|---|
| 6,584,330 B1 | 6/2003 | Ruuska |
| 2006/0184287 A1* | 8/2006 | Belady et al. ............... 700/291 |
| 2008/0051093 A1* | 2/2008 | Ojala et al. .................. 455/439 |
| 2008/0130593 A1* | 6/2008 | Scheinert et al. ............ 370/337 |
| 2010/0250992 A1* | 9/2010 | Iyer et al. .................... 713/340 |

FOREIGN PATENT DOCUMENTS

| | | |
|---|---|---|
| JP | 2002-500845 A | 1/2002 |
| JP | 2008-236727 A | 10/2008 |
| WO | 98/57516 | 12/1998 |
| WO | 02/07464 A1 | 1/2002 |
| WO | 2006/087797 A1 | 8/2006 |

OTHER PUBLICATIONS

Chiaravaglio L. et al., "Energy-Aware UMTS Access Networks", Internet Citation, Jan. 1, 2008, pp. 1-5, XP007913001, http://www.telematica.polito.it/ciullo/papers/ciullo_wgreen08.pdf.

Marsan M. A. et al, "Optimal Energy Savings in Cellular Access Networks", Communications Workshops, 2009, ICC Workshops 2009. Jun. 14, 2009, XP031515485, pp. 1-5.

Japanese Notice of Allowance issued on Feb. 17, 2014, for corresponding JP Appln. No. 2012-519895.

\* cited by examiner

POWER SAVING MECHANISM IN A RADIO ACCESS NETWORK

The present invention relates to a method and apparatus for power saving and, in particular, to power saving in radio access networks.

In a conventional radio access network there are typically thousands of cells to provide coverage and capacity to mobile devices so that the mobile devices can send and receive data from a telecommunication network. Each cell is typically served by a Base Transceiver Station (BTS). Therefore, each BTS serving a cell will consume energy which increases the network operator's cost in running the telecommunication network. Accordingly, if the power consumption of the BTSs serving the cells can be reduced then the network operator will advantageously reduce their energy supply costs as well as potentially reduce the need to implement expensive cooling systems for the BTSs.

There are also further reasons why a network operator would wish to reduce the energy consumption of their telecommunication networks.

One reason is that in emerging markets, predominantly in developing countries, they may not have a stable power supply infrastructure, which may include local diesel generators and solar power panels, and therefore being able to provide a telecommunication network that reduces the power consumption would more efficiently utilise the local power supply.

Another reason may be that the network operator will be able to advertise their telecommunication network as being more environmentally friendly which may increase sales revenue for the network operator and may raise the network operator's profile.

Thus, there is a need to provide methods and apparatus for implementing energy saving measures in a radio access network.

According to a first aspect of the present invention there is provided a method comprising: receiving a measurement data set for at least one predetermined period of time for a cell in a radio access network; processing said measurement data set to determine at least one time slot within said predetermined period of time during which said cell could have been powered down; and scheduling powering down of said cell for future time slots corresponding to said determined time slots.

Thus, in many of the embodiments the present invention enables a determination of time slots within at least one predetermined period of time during which a cell being analysed could have been powered down based on the received measurement data set. The cell can then be scheduled to be powered down during future time slots which correspond to the determined time slots.

The predetermined period of time over which the measurement data for a particular cell is taken may be, for example, 24 hours, 48 hours, 72 hours, a week, two weeks, a month and so on. The predetermined period of time may be set depending on the requirements of the network operator, the architecture of the radio access network and/or the expected usage of the cells in the radio access network. The time slots may be, for example, 30 minutes, 1 hour, 2 hours and so on depending on the requirements of the network operator.

For example, it may be decided that the predetermined period of time is 24 hours starting at 00:01 on Tuesday and that the time slots are 1 hour. Accordingly, a measurement data set for a cell covering the 24 hours from 00:01 on a Tuesday is received and this measurement data set is processed to determine for which 1 hour time slots within this 24 hour period the cell could have been powered down. In this example, it may be determined from processing the measurement data for the cell that for two of the 1 hour time slots, say between 03:00-04:00 and 04:00-05:00 on the Tuesday morning the cell could have been powered down. The method then can schedule the cell to be powered down for future times slots that correspond to the determined times slots. In other words, in the example given above the cell may be scheduled to be powered down every future Tuesday for the future time slots of 03:00-04:00 and 04:00-05:00 which correspond to the determined time slots based on the measurement data set.

In order to power down a cell, part or all of the base station transceiver serving the cell may be powered down. The base station transceiver serving the cell may be instructed to power down and to power up by, for example, the network management systems or the base station transceiver may be informed of the schedule and may power itself down and power itself up based on the received schedule.

Thus, the method of the present invention advantageously enables cells to be powered down for time periods when it is determined to be acceptable which will lead to a reduction in energy costs during the determined time slots in the future.

The measurement data set may comprise at least one measurement data where the measurement data comprises a reception level of at least one neighbouring cell to the cell being analysed. The measurement data may further comprise a Cell ID and a timestamp. The Cell ID will relate to the cell being analysed and the timestamp indicates the time at which the measurement data was taken which enables the measurement data to be processed in the time slots. The measurement data may also include reception levels (e.g. signal strengths) of up to six neighbouring cells to the cell being analysed.

The step of processing the measurement data set may further comprise comparing said reception level of said at least one neighbouring cell to a predetermined threshold to determine additional capacity requirements in said at least one neighbouring cell; storing said additional capacity requirements for said time slots within said predetermined period of time; and determining for each time slot if said at least one neighbouring cell had spare capacity to handle the additional capacity requirements based on network traffic statistics for said at least one neighbouring cell for the same time slot.

The additional capacity requirements relate to the extra capacity that would have been required in the neighbouring cell or cells had the cell being analysed been powered down at that time. The method may compare the reception levels of the neighbouring cells to a predetermined threshold to determine the additional capacity requirements in the neighbouring cells had the cell being analysed been powered down at that time. The predetermined threshold may be set at a signal strength level above which a mobile device could communicate with the neighbouring cell without any loss or degradation in quality of service. For a given measurement data it may be determined that a single neighbouring cell or a group of neighbouring cells may have had sufficient signal strength based on measured reception levels to allow the mobile device that took the measurement data to communicate with those neighbouring cells. A counter may be implemented defining the additional capacity requirements in each neighbouring cell or group of neighbouring cells where the counter may be incremented by one each when the reception level is above the predetermined threshold.

The timestamp included in the measurement data may be used to enable the additional capacity requirements to be determined for particular time slots, for example, every hour, which may then be stored, for example, in a tabulated form.

Once the measurement data set has been analysed and a table comprising the additional capacity requirements for each time slot has been generated then it may be determined whether the neighbouring cells could have handled the additional capacity requirements in the case that the cell being analysed had been powered down at that time. The determination as to whether the neighbouring cell or cells had sufficient spare capacity may be made based on the network traffic statistics for the same time slots within the same predetermined period of time.

For each time slot the additional capacity requirements in the neighbouring cells is compared with the actual network traffic statistics for the neighbouring cells where the network traffic statistics may be retrieved from a database. By considering the network traffic statistics for the neighbouring cells the method can determine whether or not the neighbouring cells had sufficient spare capacity to handle the additional capacity requirements during any of the time slots.

The step of determining for each time slot if the neighbouring cells had sufficient spare capacity may be further based on the additional capacity requirements of other cells that have been scheduled to be powered down during particular time slots if the additional capacity requirements of the other cells impacts on the neighbouring cells of the cell being analysed. Thus, if it has been determined that a further cell may be powered down between the hours of 02:00 and 03:00 on a Tuesday morning then the additional capacity requirements placed on the neighbouring cells may be taken into account when determining whether the cell being analysed can be safely powered down during the same time slots.

The step of processing the measurement data may further comprise determining whether the measurement data set is representative of a geographical area of the cell. As the cell may be scheduled to be powered down then it may be useful to determine whether or not the measurement data set is representative of the whole geographical area of the cell being analysed. This is to sufficiently ensure that if the cell is powered down then a mobile device moving anywhere within the boundary of the powered down cell will be able to communicate with the telecommunication network via at least one neighbouring cell.

In order to determine whether the measurement data set is representative of the geographical area of the cell the method may ensure that the measurement data set comprises a sufficient number of measurement data entries that statistically it will be representative of the whole geographical area of the cell.

The method may alternatively or in combination receive a measurement data set for more than one occurrence of the predetermined time period, e.g. it may receive a measurement data set for several consecutive Tuesdays, where it can be expected that, due to the mobile nature of mobile devices, the series of measurement data sets will be representative of the whole geographical area of the cell.

The method may alternatively or in combination identify a location of each measurement data in the measurement data set based on the reception levels of at least three neighbouring cells. Based on the identified locations and the known geographical area of the cell it may be determined that the measurement data set is representative of the whole geographical area of the cell.

The method may further comprise approving the schedule of powering down the cell for the time slot. The method may further comprise instructing the cell to power down.

Accordingly, if the schedule for powering down the cell is approved then the cell is instructed to power down during the specific time slots.

According to a second aspect of the present invention there is provided an apparatus adapted to: receiving a measurement data set for at least one predetermined period of time for a cell in a radio access network; processing said measurement data set to determine at least one time slot within said predetermined period of time during which said cell could have been powered down; and scheduling powering down of said cell for future time slots corresponding to said determined time slots.

According to a third aspect of the present invention there is provided an apparatus comprising an input adapted to receive a measurement data set for at least one predetermined period of time for a cell in a radio access network; a first processor adapted to process said measurement data set to determine at least one time slot within said predetermined period of time during which said cell could have been powered down; and a second processor adapted to schedule powering down of said cell for future time slots corresponding to said determined time slots.

The measurement data set comprises at least one measurement data wherein the measurement data comprises a reception level of at least one neighbouring cell to the cell. The measurement data may further comprise a Cell ID and a timestamp.

The apparatus may be further adapted to, for example, by using the first processor, compare said reception level of said at least one neighbouring cell to a predetermined threshold to determine additional capacity requirements in said at least one neighbouring cell; store said additional capacity requirements for said time slots within said predetermined period of time; and determine for each time slot if said at least one neighbouring cell had spare capacity to handle the additional capacity requirements based on network traffic statistics for said at least one neighbouring cell for the same time slot.

The apparatus may be further adapted to, for example, by using the first processor, determine whether said measurement data set is representative of a geographical area of said cell. The apparatus may be further adapted to, for example, by using the first processor, identify a location of each measurement data in said measurement data set based on said reception levels of at least three neighbouring cells.

The first processor and the second processor may be the same processor or different processors.

The apparatus may be further adapted to approve the schedule of powering down the cell for the time slot. The server may be further adapted to instruct the cell to power down.

As a skilled person in the art will appreciate, the apparatus may be adapted to perform the functions in many different ways. For example, the apparatus may be adapted by installing and executing on the apparatus the appropriate and corresponding computer readable executable code in order to enable the apparatus to perform any or all of the functions or tasks in accordance with aspects of the present invention.

The apparatus may be a server or any other computing device. The apparatus may be operated by a network operator or by the supplier or provider of the radio access network or telecommunication network.

According to a fourth aspect of the present invention there is provided a computer program product comprising computer readable executable code for: receiving a measurement data set for at least one predetermined period of time for a cell in a radio access network; processing said measurement data set to determine at least one time slot within said predetermined period of time during which said cell could have been powered down; and scheduling powering down of said cell for future time slots corresponding to said determined time slots.

The computer program product may further comprise computer readable executable code for performing any or all of the functions in accordance with the aspects of the invention.

According to a fifth aspect of the present invention there is provided a method comprising receiving a request to generate a measurement data set for a cell for a predetermined period of time; identifying measurement data relating to the cell; and storing the measurement data in the measurement data set.

Thus, the measurement data set may be generated by identifying the measurement data relating to a cell to be analysed, as indicated in the request, and storing the measurement data in the measurement data set. This will enable the measurement data for a cell for a predetermined time period (e.g. 24 hours, 48 hours, 72, hours, a week, two weeks, a month and so on) to be collated and stored in a measurement data set.

The request may comprise a Cell ID to identify the cell to be analysed and a parameter that defines the time period over which the measurement data set is to be generated. The measurement data may be received from mobile devices in a network where the measurement data may include a Cell ID of the cell the mobile device is in communication with, a timestamp and reception levels of up to six neighbouring cells as measured by the mobile device.

The step of identifying the measurement data relating to the cell may comprise comparing the Cell ID of the received measurement data with the cell for which the measurement data set is to be generated. The step of storing the measurement data in the measurement data set may comprise storing every nth measurement data in the measurement data set. The method may further comprise transmitting the measurement data set to the originator of the request.

According to a sixth aspect of the present invention there is provided an apparatus adapted to receive a request to generate a measurement data set for a cell for a predetermined period of time; identify measurement data relating to the cell; and store the measurement data in the measurement data set.

According to a seventh aspect of the present invention there is provided an apparatus comprising an input to receive a request to generate a measurement data set for a cell for a predetermined period of time; a first processor to identify measurement data relating to the cell; and a second processor to store the measurement data in the measurement data set.

The first processor and the second processor may be the same processor or different processors.

As a skilled person in the art will appreciate, the apparatus may be adapted to perform the functions in many different ways. For example, the apparatus may be adapted by installing and executing on the apparatus the appropriate and corresponding computer readable executable code in order to enable the apparatus to perform any or all of the necessary functions and tasks in accordance with aspects of the present invention. The apparatus may be a Base Station Controller.

According to an eighth aspect of the present invention there is provided a computer program product comprising computer readable executable code for receiving a request to generate a measurement data set for a cell for a predetermined period of time; identifying measurement data relating to the cell; and storing the measurement data in the measurement data set.

The computer program product may further comprise computer readable executable code for performing any or all of the functions in accordance with the aspects of the invention.

Embodiments of the present invention will now be described, by way of example only, and with reference to the accompanying drawings, in which.

Figure 1:
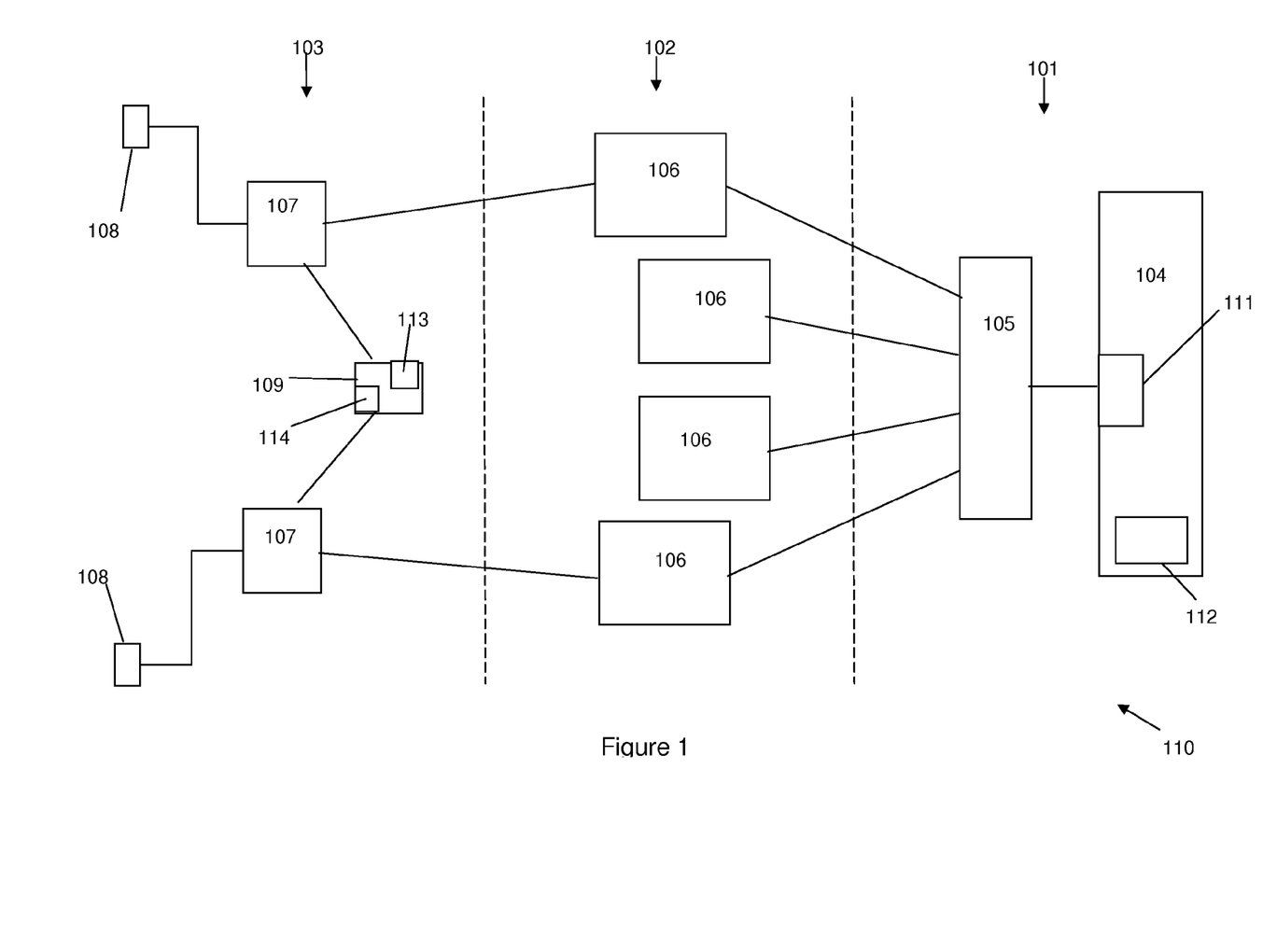
FIG. 1 is a block diagram of a typical telecommunication network in accordance with aspects of the invention.

As shown in FIG. 1, a conventional telecommunication network 110 in a simplified form comprises several layers including an access network layer 103, a core network layer 102 and management layers 101.

The core network layer 102 typically comprises network elements 106 which provide additional functionality and switching capabilities to transport the network traffic across the core network 102. The management layers 101 typically comprise an Element Management System (EMS) 105 to manage the network elements in the network, and a Network Management System (NMS) 104 to manage the telecommunication network 110 as a whole. The NMS may comprise one or more inputs and outputs 111 and one or more processors 112.

The access layer 103 of the network may include a radio access network which provides the access point and functionality for communication devices 108, including mobile devices, to communicate with the telecommunication network 110 enabling the communication devices 108 to transmit network traffic over the telecommunication network 110 and receive network traffic from the telecommunication network 110. In terms of mobile communications, the radio access network may comprise a plurality of Base Transceiver Stations (BTS) 107 typically in the region of hundreds if not thousands of BTSs 107 to provide the access point for mobile devices 108. The access network 103 may also typically comprise at least one Base Station Controller (BSC) 109 for controlling the BTSs 107 in the access network 103. The BSC may comprise one or more inputs and outputs 113 and one or more processors 114.

The architecture and design of the access layer 103 of the telecommunication network 110 including the layout and positioning of BTSs 107 varies depending on the requirements of network operator, the required network coverage and the expected network usage from mobile devices, e.g. the capacity requirements. Typically, one BTS 107 will serve a cell where the cell is defined as the geographical area covered by the signal range of the BTS 107. Thus, in order to power down a cell then part or all of the BTS 107 serving the cell is instructed to power down.

For example, in areas where there is expected to be a large demand for access to the telecommunication network 110 from mobile devices 108 resulting in high volumes of network traffic, such as in densely populated urban areas, then the architecture of the access network 103 will typically include several overlapping cells. Furthermore, in areas where an exceptionally high volume of network traffic is expected and additional capacity required then the cells may also be contained completely within another cell.

Figure 2:
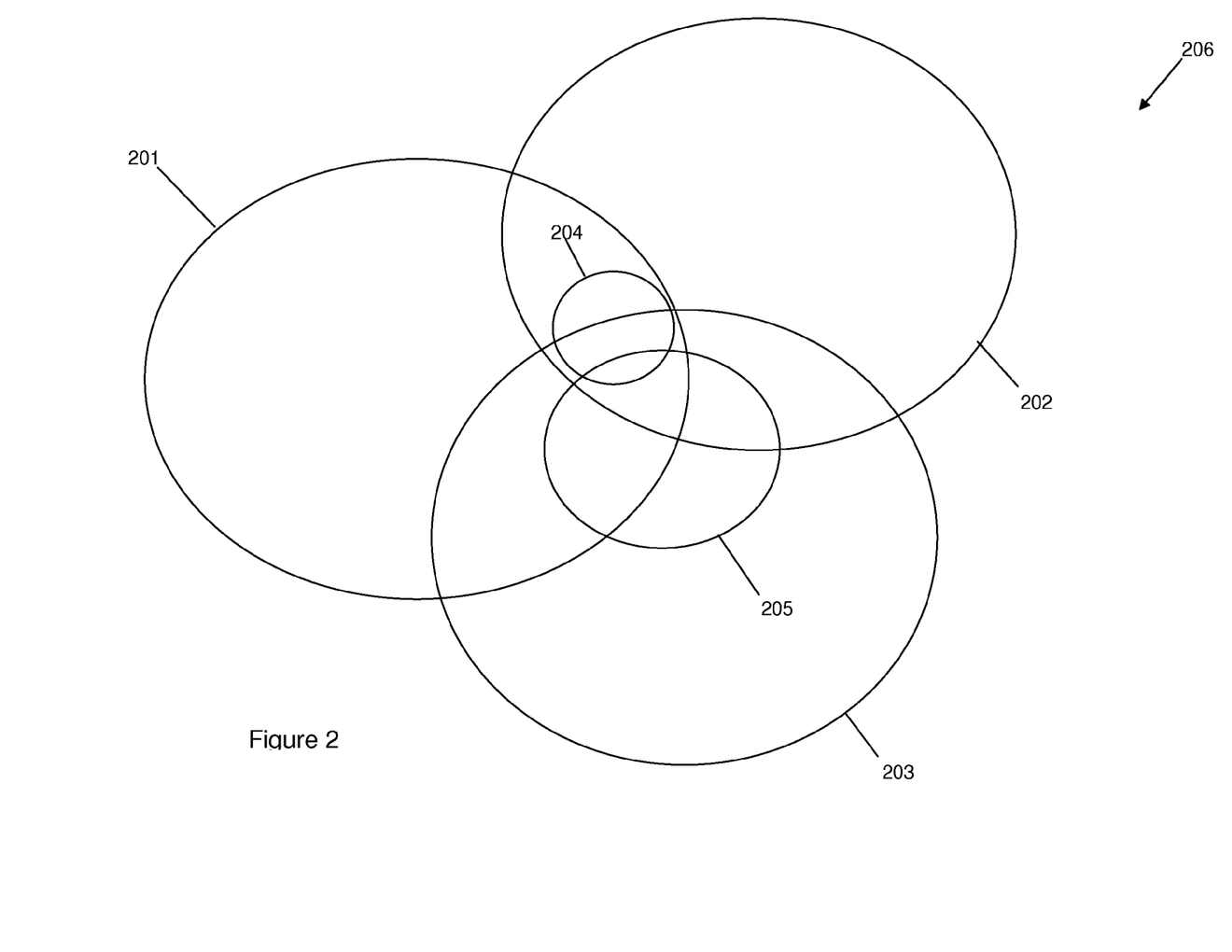
FIG. 2 is a schematic diagram of a cell architecture in accordance with aspects of the invention.

An example of an arrangement of cells in an area where high volumes of network traffic are expected is shown in FIG. 2. As can be seen, three cells 201, 202 and 203 cover a wide area and are overlapping so that mobile devices moving around this area will have constant network coverage. In this example architecture there are two "hotspots" where the number of mobile devices connecting to the network is expected to substantial at certain peak times and therefore, these hotspots are also served by the additional macro cells 204 and 205.

In areas where there the expected volume of network traffic and expected number of mobile devices wishing to connect with the network is low, such as in low populated rural areas, then the architecture of the access network will comprise fewer cells which will provide sufficient capacity and network coverage.

As mentioned above, FIG. 2 shows part of an access network 206 that includes several overlapping cells 201, 202, 203 and two macro cells 204 and 205 to cater for the identified peak demand of mobile devices connecting with the network in that area. However, at certain times of the day or night the capacity required may be significantly reduced as the demand from mobile devices is reduced. Accordingly, at these times of the day some of the cells, in particular the macro cells 204, 205, may effectively be redundant as the remaining cells 201, 202, 203 in the access network 206 can adequately provide the necessary capacity at the times of reduced demand. Therefore, the network operator may wish to power down any excess cells, by powering down part or all of the BTS serving each cell, in order to reduce the power supply costs but without affecting network coverage and mobile device user's perceived quality of service.

In a typical access network the mobile devices communicate with a BTS that has the strongest signal strength and serves the cell within which the mobile device is currently located. For several reasons, such as to determine the BTS with the strongest signal strength, the mobile devices will transmit typically every 0.5 seconds measurement data to the BCS via a BTS. The measurement may typically comprise the Cell ID of the cell that the mobile device is currently in communication with. The measurement data may also typically comprise the reception level (RxL), in other words the signal strength, of up to six neighbouring cells.

Accordingly, by analysing and processing the received measurement data from the mobile devices over a predetermined time period the BSC or the NMS can determine and identify time slots in the predetermined period of time when particular cells could have been powered down in order to save operating costs. However, the analysis needs to be rigorous enough to ensure that network coverage and therefore the mobile device user's experience will not be affected if the cell is then scheduled to be powered down in the future during time slots that correspond to the time slots that have been determined and identified from the analysis of the measurement data.

The BSC or the NMS or a combination of the two may be used to analyse and process the measurement data received from mobile devices over a predetermined time period in order to determine whether a particular cell may be powered down during certain time slots.

In this embodiment the NMS will perform the analysis and processing of the measurement data and the NMS may comprise two modules for this purpose. The first module in the NMS initiates and instructs the BSC to collate measurement data relating to a particular cell over a predetermined time period into a measurement data set and to report the measurement data set to the NMS. This first module then processes the received measurement data set to calculate various parameters which can be compared to network traffic statistics retrieved from an NMS database in order to identify time slots during which the BTS serving the cell may be powered down in the future.

If the time slots identified by the first module are approved by the network operator then the time slots are added to a schedule. The second module in the NMS performs the function of instructing the BTS serving a cell to power down and consequently to power up according to the schedule.

In many of the embodiments, the first module in the NMS informs the BSC of the cell or cells that have been identified as cells that may potentially be powered down. The BSC is then instructed to collate for each identified cell the measurement data received from mobile devices communicating with each identified cell over a predetermined time period which may be specified by the NMS.

The BSC will accordingly generate a measurement data set for each cell that the NMS has identified for the identified predetermined time period. As described above, mobile devices typically transmit measurement data to the BSC every 0.5 seconds. The measurement data includes the Cell ID of the cell that the mobile device is primarily communicating with which enables the BSC to identify the measurement data originating from a cell being monitored. The measurement data received also includes the reception level (RxL) data (e.g. the signal strength) of up to six neighbouring cells along with a timestamp indicating the time at which the measurement data was taken.

The BSC may generate a measurement data set for each cell being monitored by collating every measurement data received from mobile devices communicating with the cell. However, this will require the BSC to store a large quantity of measurement data in the BSC. Accordingly, depending on the requirements the BSC may only collate and store every nth measurement data in order to reduce the storage capacity required in the BSC, for example, the BSC may only collate and store every $10^{th}$ measurement data.

The predetermined time period during which a measurement data set is generated may be set by the network operator and may be any time period considered suitable for the purpose of identifying time slots during which the cell may be powered down. For example, the predetermined period of time may be one day, two days, a week, a couple of weeks, a month and so on.

Once the BSC has generated the measurement data set for a cell over the predetermined time period then the measurement data set is transmitted to the NMS for processing. The measurement data set may be transmitted to the NMS in either a push or pull manner. In other words, once the measurement data set has been generated it may be automatically transmitted to the NMS (e.g. in a push manner) or the BSC may wait for the NMS to request the measurement data set before transmitting it to the NMS (e.g. in a pull manner). It will also be appreciated that the BSC, or an external server or computing device, could alternatively process the generated measurement data set.

On receipt of the measurement data set relating to a cell that may potentially be powered down the NMS processes the measurement data set in order to determine if the cell can be powered down and, if so, to identify the time slots during which the cell can be powered down in the future.

The measurement data set for a particular cell may comprise a list of measurement data entries in a sequential time order based on the timestamp of each measurement data entry. Each measurement data entry in the measurement data set is analysed to determine the additional capacity requirements in any one of, or any combination of, the neighbouring cells had the cell being analysed been powered down at the time that the measurement data was taken by a mobile device. Any neighbouring cells that are also potential power down candidates are not considered when determining the additional capacity requirements.

In order to determine the additional capacity requirements, the RxL of each of the neighbouring cells measured by the mobile device is compared to a predetermined threshold value. If the RxL is above the predetermined threshold then the signal strength of the neighbouring cell is sufficient to enable the mobile device to communicate with the BTS serving the neighbouring cell without any loss of quality of service. Accordingly, for each measurement data entry in the measurement data set a neighbouring cell or combination of neighbouring cells where the RxL is above the threshold value is identified and a counter corresponding to the neighbouring cell or combination of neighbouring cells indicating the additional capacity required is incremented by one.

In order to determine the time slots that the cell being analysed could potentially be powered down the measurement data set may be divided into time slots. For example, the measurement data set may be considered in one hour time slots and the additional capacity requirements in the neighbouring cells are determined for each hour time slot within the predetermined time period during which the measurement data set was generated. After each hour time slot the value of the counters indicating the additional capacity required in the neighbouring cells or combination thereof are stored in a table and the counters reset to zero. As mentioned hereinabove, each measurement data entry in the measurement data set includes a timestamp which allows the NMS to divide the measurement data set into time slots.

Once the complete measurement data set for the predetermined time period has been analysed and processed then the additional capacity requirements in the neighbouring cells, should the cell being analysed have been powered down during the predetermined time period, for each time slot will have been identified and tabulated.

The additional capacity requirements in the neighbouring cells for each time slot are compared with network traffic statistics for the access network in order to determine whether the neighbouring cells would have had sufficient spare capacity to handle the additional capacity requirements during any of the time slots. The network traffic statistics for the access network are typically constantly monitored by the management systems in a conventional telecommunication network and stored in a database in the NMS. The network traffic statistics obtained for the same time period as the measurement data set can be used in the embodiments and, in particular, the network traffic statistics that relate to the network traffic handled by each of the neighbouring cells.

Based on this comparison between network traffic statistics and the additional capacity requirements the NMS can identify the time slots within the predetermined time period during which the neighbouring cells have sufficient available spare capacity to safely power down the cell being analysed. The NMS may then schedule the BTS serving the cell being analysed to be powered down during future occurrences of the identified time slot. For example, if the comparison between the network traffic statistics and the additional capacity requirements show that the cell being analysed could safely be powered down during the time slot of 02:00 and 04:00 on a Wednesday morning then the NMS will schedule the cell to be powered down every future Wednesday morning for the time slot of 02:00 to 04:00. In other words, the cell will be scheduled to power down during future time slots that correspond to the determined or identified time slots during the predetermined period of time.

In many of the embodiments it may be useful to determine whether the measurement data received covers the whole geographical area of the cell, or is representative of the whole geographical area of the cell, that is being analysed with the view of powering the cell down.

As discussed hereinabove, measurement data received from a mobile device located in the cell being analysed is used to determine whether that mobile device could have communicated with a neighbouring cell had the cell being analysed been powered down at that time. If the neighbouring cells had sufficient spare capacity to handle the additional communications from the mobile devices during the time slot then it can be determined that the cell being analysed may be powered down during that time slot in the future.

However, the measurement data received from mobile devices may not be representative of the whole geographical area of the cell. For example, the measurement data forming the measurement data set may be measured by mobile devices that are located in small pockets or areas of the cell being analysed. As such, there may exist blackspot areas within the geographical area of the cell where no measurement data has been taken and in these blackspot areas it may be the case that none of the neighbouring cells will have a sufficient signal strength to enable the mobile device to communicate with a neighbouring cell.

Accordingly, if the cell being analysed is powered down then a mobile device moving into the blackspot area would not be able to communicate with the telecommunication network. Thus, in many of the embodiments the issue of ensuring that the whole geographical area of a cell being analysed before deciding to power down the cell in the future is also addressed.

In one example, the measurement data set may not be analysed or processed until a certain number of measurement data entries are included in the measurement data set. For example, the measurement data set may have to contain 1000, 2000, 5000, 10000 and so on, before the measurement data set will be processed. The number of measurement data entries before the measurement data set will be processed can be set at any value by the network operator. Based on the location of the cell, the expected use of the cell or the known size of the cell the network operator may set the number of measurement data entries to a value that statistically is expected to cover the whole geographical area of the cell or be representative of the whole geographical area of the cell being analysed.

A second example for ensuring that the measurement data set is representative of the whole geographical area of the cell being analysed may include collecting more than one measurement data set for the predetermined period of time that the cell is being analysed. For example, if the predetermined period of time is, say, 24 hours from 00:01 on Tuesday then a measurement data set will be generated for two or more of the same period of time, e.g. for two or more consecutive Tuesdays. Each measurement data set can be analysed and processed to see if there is consistently a time slot in the predetermined period of time where the cell being analysed could be powered down in the future.

This method of generating a series of measurement data sets for the same predetermined period of time will statistically increase the chance that measurement data has been obtained which is representative of the whole geographical area of the cell being analysed. This is because mobile devices, by their very nature, are not static and will therefore appear in different geographical locations within the cell being analysed during the same predetermined period of time, e.g. during consecutive Tuesdays.

Alternatively, if from processing and analysing the measurement data set for the predetermined period of time, say 24 hours from 00:01 on a Tuesday, it is determined that the cell being analysed may be powered down during the time slot of 02:00 and 03:00 on Tuesday morning then, before the cell is scheduled to be powered down during this time slot every future Tuesday morning, further measurement data sets may be generated for at least one more Tuesday between 02:00 and 03:00. By generating several measurement data sets for the time slot then statistically it can be assumed that the measurement data will have been taken by mobile devices moving throughout the whole geographical area of the cell being analysed.

A third example for ensuring that the measurement data set is representative of the whole geographical area of the cell being analysed may include combining mobile device location data with the measurement data. For example, based on the measurement data received, in particular the Cell ID and the reception levels of at least three neighbouring cells, the location of the mobile device taking the measurement data can be determined to a reasonable level of accuracy. By determining the location of the mobile devices it can be determined whether the whole geographical area of the cell being analysed has been considered or whether there are any "blackspot areas" where no measurement data has been taken by mobile devices. If it is determined that the measurement data is representative of the whole geographical area of the cell being analysed then the cell may be powered down during time slots. However, if it is determined that the measurement data is not representative of the whole geographical area of the cell being analysed then further measurement data sets can be generated for the predetermined period of time until the measurement data is representative of the whole geographical area of the cell being analysed.

Accordingly, in many of the embodiments it may be determined that the measurement data is representative of the whole geographical area of the cell being analysed. Thus, the cell may be scheduled to be powered down knowing that there are no areas in the cell within which a mobile device would not be able to communicate with the telecommunication network should the cell be powered down.

Turning to the example access network architecture shown in FIG. 2, the network operator can identify cells 204 and 205 as cells that have been provisioned to provide extra capacity rather than network coverage. Accordingly, cells 204 and 205 could potentially be powered down at times when the demand from mobile devices is expected to be low enough that it can be sufficiently handled by the neighbouring cells 201, 202 and 203. Thus, the network operator may wish to analyse the usage of cells 204 and 205 over a predetermined period of time to identify time slots during which cell 204 and/or cell 205 could be powered down.

The NMS will accordingly instruct the BSC to collate measurement data relating to cells 204 and 205 over a predetermined time period, for example 24 hours.

Turning firstly to the analysis of cell 204, the NMS will instruct the BSC to generate a measurement data set for cell 204 over a predetermined time period which in this example will be 24 hours starting at 00:01 on a Wednesday. The BSC will identify the relevant measurement data received from mobile devices using the Cell ID included in the measurement data. In this example, only every $10^{th}$ received measurement data will be added to the measurement data set for cell 204 in order to reduce the storage requirements in the BSC. Once the measurement data set for the 24 hour time period has been generated it is transmitted to the NMS to be processed.

The measurement data set for cell 204 will include a list of measurement data received from mobile devices communicating with the BTS serving cell 204 in a time ordered sequence. The measurement data includes the RxL (e.g. the signal strength measured by the mobile device) of neighbouring cells 201, 202, 203 and 205 being RxL_201, RxL_202, RxL_203 and RxL_205, respectively. However, as macro cell 205 is also on the list of cells that may be potentially powered down then the RxL value for cell 205 (RxL_205) will not be taken into account. This is because both cells 204 and 205 could potentially be powered down at the same time and thus cell 205 should not be taken into account when determining if the remaining cells in the access network can handle the additional capacity requirements should cell 204 be powered down.

For each measurement data entry in the measurement data set generated for cell 204, the first module of the NMS will compare the RxL levels of the neighbouring cells being RxL_201, RxL_202 and RxL_203 to a predetermined threshold value (TH) to determine whether the mobile device that took the measurements could have communicated with a neighbouring cell, or a combination of neighbouring cells, with an acceptable level of quality of service. If the RxL level of one or more neighbouring cells is above the threshold value (TH) then a counter that indicates the additional capacity requirements for the neighbouring cell or cells is incremented by one. Based on the timestamp of the measurement data the counters indicating the additional capacity requirements are tabulated after every hour (as the time slot in this example has been set to one hour by the network operator) and the counters reset to zero so that the additional capacity requirements can be determined for each hour of the predetermined time period enabling the NMS to identify the one hour time slots in the 24 hour period that the cell 204 may be powered down.

Accordingly, in the present example, the analysis performed written in pseudo-code language is:

FOR all measurement data in measurement data set for cell 204
    excluding RxL_205 as cell 205 is also a potential power down candidate
    CASE
RxL_201>TH and RxL_202<TH and RxL_203<TH THEN
    201_Capacity=201_Capacity+1;
    RxL_201>TH and RxL_202>TH and RxL_203<TH THEN 201_202_Capacity=201_202_Capacity+1;
    RxL_201>TH and RxL_202>TH and RxL_203>TH THEN
    201_202_203_Capacity=201_202_203_Capacity+1;
    RxL_201<TH and RxL_202>TH and RxL_203<TH THEN 202_Capacity=202_Capacity+1;
    RxL_201<TH and RxL_202>TH and RxL_203>TH THEN 202_203_Capacity=202_203_Capacity+1;
    RxL_201<TH and RxL_202<TH and RxL_203>TH THEN 203_Capacity=203_Capacity+1;
    END CASE
    after every hour tabulate capacity counter results and reset capacity counters to zero;
END FOR Once the measurement data for the 24 hours has been analysed and a table of additional capacity requirements for each hour has been generated then the NMS retrieves network traffic statistics for the same 24 hour period, in other words the network traffic statistics for the 24 hours starting at 00:01 on Wednesday morning, from a database in the NMS. The network traffic statistics are typically collated and stored in a database on the NMS in conventional telecommunication networks and can be utilised by many of the embodiments of the present invention.

The additional capacity requirements in the neighbouring cells 201 202 and 203 for each hour in the table of results are then compared with the network traffic statistics for the same time period. Based on the comparison between the additional capacity requirements and the network traffic statistics the NMS can identify the hourly time slots in the 24 hour time period from 00:01 on a Wednesday morning that neighbouring cells 201, 202, 203 had sufficient spare capacity to handle the additional traffic should cell 204 have been powered down. For example, the NMS may identify that the BTS serving cell 204 could have been safely powered down between 02:00 and 04:00 on the Wednesday morning. The NMS will then add the hours of 02:00 to 04:00 on Wednesdays to a scheduler so that every future Wednesday morning between the hours of 02:00 and 04:00 the BTS serving cell 204 is powered down as it is expected that the neighbouring cells 201, 202, 203 will have sufficient spare capacity during those time slots.

The proposed schedule for powering down the BTS serving cell 204 is then approved by the network operator and the second module of the NMS will transmit a power down signal to the BTS serving cell 204 every Wednesday morning at 02:00 and transmit a power up signal to the BTS serving cell 204 every Wednesday morning at 04:00. Alternatively, the second module of the NMS may inform the BTS serving cell 204 of the scheduled power down and power up times in advance so that the BTS can perform the power down and power up process automatically.

If during the power down phase it is determined from network traffic information that the additional capacity provided by the powered down cell is required, e.g. there is a sudden surge in network traffic, then the powered down cell can be instructed to power up before the scheduled power up time.

As described hereinabove, the NMS may also determine whether the measurement data set is representative of the whole geographical area of the cell being analysed before scheduling the cell to be powered down. This may be achieved by any or a combination of methods described above.

The methods include generating a measurement data set for a cell that includes a sufficient number of measurement data entries that statistically it is likely that the measurement data set is representative of the whole geographical area of the cell.

The methods may also include generating several measurement data sets where each measurement data set corresponds to the same predetermined time period. In other words, if the predetermined period of time is 24 hours starting at 00:01 on a Tuesday then a measurement data set will be generated for several consecutive Tuesdays for the 24 hour period. As mobile devices are mobile then it can be assumed that within each period of time that the measurement data set is generated the mobile devices will be at different locations within the cell and therefore should be representative of the whole geographical area of the cell.

The method may also include determining from the measurement data received from each mobile device the location of the mobile device based on the Cell ID and the reception levels of at least three neighbouring cells. By determining the location of the mobile device taking each measurement data then it can be determined whether the measurement data set is representative of the whole geographical area of the cell being analysed.

Accordingly, it can be determined that there is sufficient coverage from the neighbouring cells to ensure that a mobile device at any location in the geographical area of a cell that is powered down can communicate with the telecommunication network.

In the above example, the NMS analysed the measurement data for cell 204 in isolation in order to determine whether cell 204 could be powered down at particular times during a 24 hour time period. As mentioned hereinabove, in the example shown in FIG. 2 cell 205 may also potentially be powered down during particular time slots as cell 205 is also for providing capacity rather than network coverage. The measurement data set for cell 205 is generated by the BSC for a predetermined time period, for example for 24 hours starting at 00:01 on a Wednesday morning, as described above in relation to cell 204. The measurement data set is then again transmitted to the NMS for analysis and processing. The first module of the NMS will then process the measurement data set in a similar manner to that described above in relation to cell 204. In other words, the reception levels RxL of neighbouring cells 201, 202 and 203 are compared to a predetermined threshold value and the additional capacity requirements are tabulated for each hourly time slot of the predetermined time period over which the measurement data was collated. The reception level of macro cell 204, e.g. RxL_204, is not used in the analysis as cell 204 is also on the potential list of cells that may be powered down.

The NMS may then compare the tabulated hourly additional capacity requirements in the neighbouring cells with the network traffic statistics stored in a database on the NMS in order to identify the times at which the BTS serving cell 205 may be safely powered down.

However, if it has previously been identified that cell 204 can be powered down, for example between the hours of 02:00 and 04:00 on a Wednesday morning, then the additional capacity requirements placed on the neighbouring cells 201, 202 and 203 needs to be taken into account when determining whether cell 205 can be safely powered down during those hours of 02:00 to 04:00 on a Wednesday morning without affecting quality of service. Thus, the tabulated additional capacity requirements determined if cell 205 had been powered down during the predetermined time period is compared with the network traffic statistics in combination with the additional capacity load expected from powering down cell 204 in order to determine whether the neighbouring cells 201, 202 and 203 has sufficient spare capacity to handle cell 205 being powered down at the same time as cell 204.

The additional capacity load expected from powering down cell 204 during the scheduled time slot would have previously been tabulated and therefore may be taken into account when processing and analysing the measurement data set for cell 205.

Accordingly, the embodiments of the present invention describe methods and systems for monitoring and analysing network usage and capacity requirements in order to identify time slots during which cells in the access network may be powered down. By powering down cells when they are not required savings can be made on the cost of powering the cells. In the embodiments described above the BTS serving the cell is powered down. However, as a person skilled in the art will appreciate the BTS may only power down any or all of the transceivers present in the BTS.

The method of the present invention may be used in any architecture or arrangement of an access network to identify whether any number of cells may be powered down. The measurement data collated by the BSC may be for any predetermined time period, for example, 24 hours, 48 hours, a week, two weeks, a month, two months, six months and so on depending on the requirements of the network operator. The measurement data set analysed by the NMS may also be divided into any length time slot, for example, thirty minutes, one hour, two hours, three hours and so on, in order to identify the time slots in the predetermined time period that a particular cell may be powered down.

In the above described embodiments the BSC collates the measurement data set which is then transmitted to the NMS for analysis. However, as a person skilled in the art will appreciate, the BSC may analyse the collated measurement data set or an external server or computing device may analyse the collated measurement data set.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising:
receiving a measurement data set for at least one predetermined period of time for a cell in a radio access network;
processing said measurement data set to determine at least one time slot within said predetermined period of time during which said cell could have been powered down while maintaining network capacity during the at least one time slot, wherein said measurement data set comprises at least one measurement data wherein said measurement data comprises a reception level of at least one neighboring cell to said cell; and
scheduling powering down of said cell for future time slots corresponding to said determined time slots.

2. A method comprising:
receiving a measurement data set for at least one predetermined period of time for a cell in a radio access network;
processing said measurement data set to determine at least one time slot within said predetermined period of time during which said cell could have been powered down, wherein said measurement data set comprises at least one measurement data wherein said measurement data comprises a reception level of at least one neighboring cell to said cell; and
scheduling powering down of said cell for future time slots corresponding to said determined time slots,
wherein said step of processing said measurement data further comprises
comparing said reception level of said at least one neighboring cell to a predetermined threshold to determine additional capacity requirements in said at least one neighboring cell;
storing said additional capacity requirements for said time slots within said predetermined period of time; and
determining for each time slot if said at least one neighboring cell had spare capacity to handle the additional capacity requirements based on network traffic statistics for said at least one neighboring cell for the same time slot.

3. A method comprising:
receiving a measurement data set for at least one predetermined period of time for a cell in a radio access network;
processing said measurement data set to determine at least one time slot within said predetermined period of time during which said cell could have been powered down, wherein said measurement data set comprises at least one measurement data wherein said measurement data comprises a reception level of at least one neighboring cell to said cell; and
scheduling powering down of said cell for future time slots corresponding to said determined time slots,
wherein said step of processing said measurement data set further comprises
determining whether said measurement data set is representative of a geographical area of said cell; and
identifying a location of each measurement data in said measurement data set based on said reception levels of at least three neighboring cells.

4. An apparatus comprising:
an input adapted to receive a measurement data set for at least one predetermined period of time for a cell in a radio access network;
a first processor adapted to process said measurement data set to determine at least one time slot within said predetermined period of time during which said cell could have been powered down while maintaining network capacity during the at least one time slot, wherein said measurement data set comprises at least one measurement data wherein said measurement data comprises a reception level of at least one neighboring cell to said cell; and
a second processor adapted to schedule powering down of said cell for future time slots corresponding to said determined time slots.

5. An apparatus comprising:
an input adapted to receive a measurement data set for at least one predetermined period of time for a cell in a radio access network;
a first processor adapted to process said measurement data set to determine at least one time slot within said predetermined period of time during which said cell could have been powered down, wherein said measurement data set comprises at least one measurement data wherein said measurement data comprises a reception level of at least one neighboring cell to said cell; and
a second processor adapted to schedule powering down of said cell for future time slots corresponding to said determined time slots,
wherein said first processor is further adapted to
compare said reception level of said at least one neighboring cell to a predetermined threshold to determine additional capacity requirements in said at least one neighboring cell;
store said additional capacity requirements for said time slots within said predetermined period of time; and
determine for each time slot if said at least one neighboring cell had spare capacity to handle the additional capacity requirements based on network traffic statistics for said at least one neighboring cell for the same time slot.

6. An apparatus comprising:
an input adapted to receive a measurement data set for at least one predetermined period of time for a cell in a radio access network;
a first processor adapted to process said measurement data set to determine at least one time slot within said predetermined period of time during which said cell could have been powered down, wherein said measurement data set comprises at least one measurement data wherein said measurement data comprises a reception level of at least one neighboring cell to said cell; and
a second processor adapted to schedule powering down of said cell for future time slots corresponding to said determined time slots,
wherein said first processor is further adapted to
determine whether said measurement data set is representative of a geographical area of said cell; and
identify a location of each measurement data in said measurement data set based on said reception levels of at least three neighboring cells.

7. A computer program product, embodied on a non-transitory computer readable medium, comprising computer readable executable code to control a processor to perform a process, comprising:

receiving a measurement data set for at least one predetermined period of time for a cell in a radio access network;

processing said measurement data set to determine at least one time slot within said predetermined period of time during which said cell could have been powered down while maintaining network capacity during the at least one time slot, wherein said measurement data set comprises at least one measurement data wherein said measurement data comprises a reception level of at least one neighboring cell to said cell; and scheduling powering down of said cell for future time slots corresponding to said determined time slots.

8. A method comprising the steps of:

receiving a request to generate a measurement data set for a cell for a predetermined period of time during which said cell could have been powered down in at least one time slot within said predetermined period of time, wherein said measurement data set comprises at least one measurement data wherein said measurement data comprises a reception level of at least one neighboring cell to said cell;

identifying measurement data relating to said cell;

storing said measurement data in said measurement data set; and powering down said cell while maintaining network capacity during the at least one time slot.

9. An apparatus comprising:

an input to receive a request to generate a measurement data set for a cell for a predetermined period of time during which said cell could have been powered down in at least one time slot within said predetermined period of time, wherein said measurement data set comprises at least one measurement data wherein said measurement data comprises a reception level of at least one neighboring cell to said cell;

a first processor to identify measurement data relating to said cell;

a second processor to store said measurement data in said measurement data set; and a third processor to power down said cell while maintaining network capacity during the at least one time slot.

10. A computer program product, embodied on a non-transitory computer readable medium, comprising computer readable executable code to control a processor to perform a process, comprising:

receiving a request to generate a measurement data set for a cell for a predetermined period of time during which said cell could have been powered down in at least one time slot within said predetermined period of time, wherein said measurement data set comprises at least one measurement data wherein said measurement data comprises a reception level of at least one neighboring cell to said cell;

identifying measurement data relating to said cell;

storing said measurement data in said measurement data set; and powering down said cell while maintaining network capacity during the at least one time slot.

* * * * *